(No Model.)  3 Sheets—Sheet 1.

T. DUNN.
PNEUMATIC TIRE.

No. 477,996. Patented June 28, 1892.

Witnesses
Inventor:
Thomas Dunn.

(No Model.) 3 Sheets—Sheet 2.

T. DUNN.
PNEUMATIC TIRE.

No. 477,996. Patented June 28, 1892.

Witnesses,
Inventor.
Thomas Dunn (No Model.) 3 Sheets—Sheet 3.
T. DUNN.
PNEUMATIC TIRE.
No. 477,996. Patented June 28, 1892.
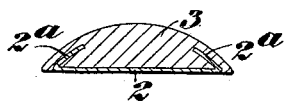
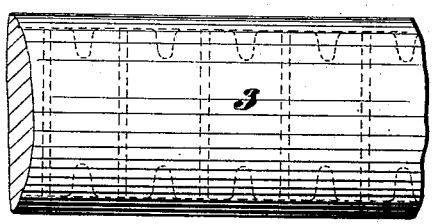
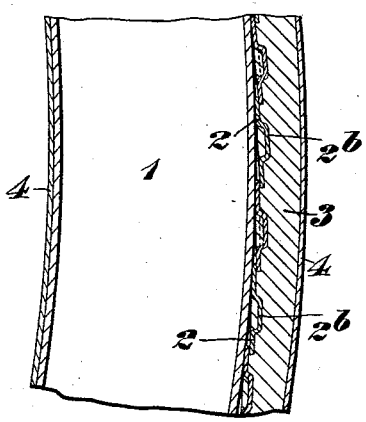
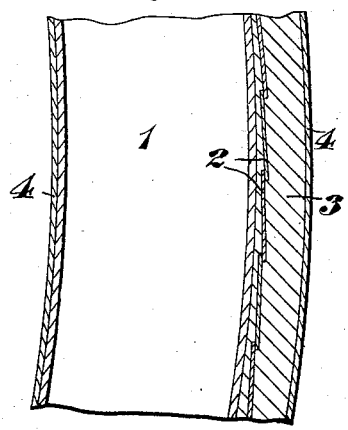
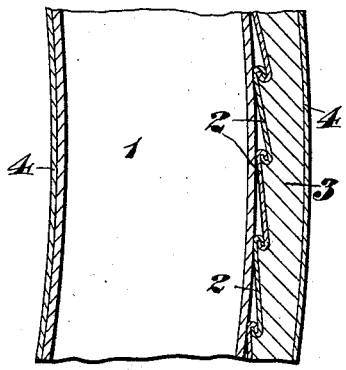
Witnesses
Inventor
Thomas Dunn.

UNITED STATES PATENT OFFICE.

THOMAS DUNN, OF LONDON, ENGLAND.

PNEUMATIC TIRE.

SPECIFICATION forming part of Letters Patent No. 477,996, dated June 28, 1892.

Application filed December 10, 1891. Serial No. 414,577. (No model.)

*To all whom it may concern:*

Be it known that I, THOMAS DUNN, a subject of the Queen of Great Britain and Ireland, residing at Brixton Hill, London, in the county of Surrey, England, have invented Improvements in the Construction of Pneumatic Tires, of which the following is a specification.

My invention has for its object to prevent the air-tubes of pneumatic tires being punctured by nails or other sharp or pointed obstacles met with on roads, and at the same time to improve the resiliency and ease of running of such tires, instead of impairing these qualities, as in the constructions heretofore adopted for this purpose. For these purposes there is used in conjunction with an outer covering or tube forming or inclosing the air tube or chamber a protecting-band constructed to be capable when the tire is rolling, while supporting a load, of readily undergoing slight contraction and expansion (or reduction and increase) of length, and an elastic strip of plano-convex cross-section arranged between the protecting-band and the outer covering or tube, so that it is constantly subjected to the pressure of the air within the air tube or chamber.

Figure 1:
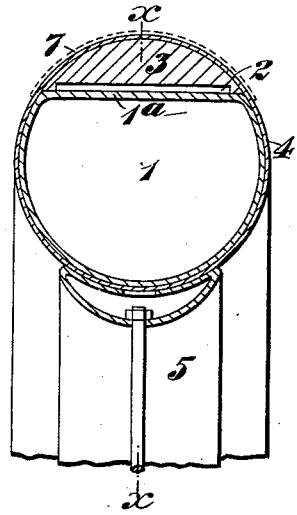
Figure 2:
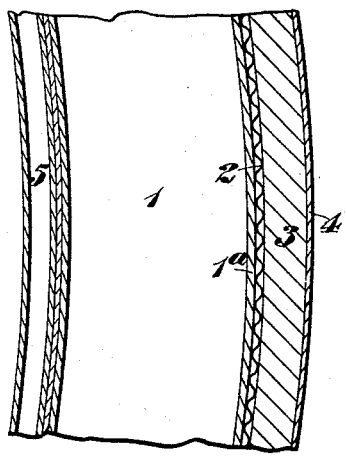
Figure 3:
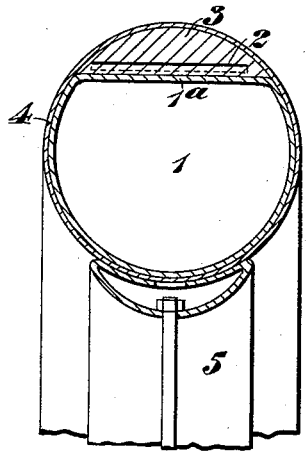
Figure 4:
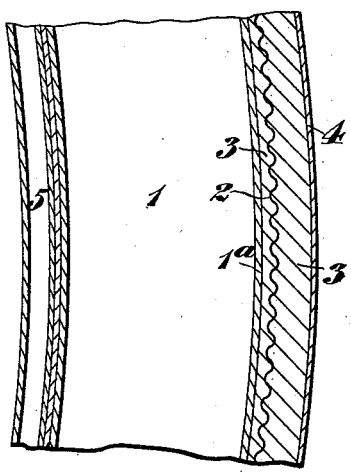
Figure 8:
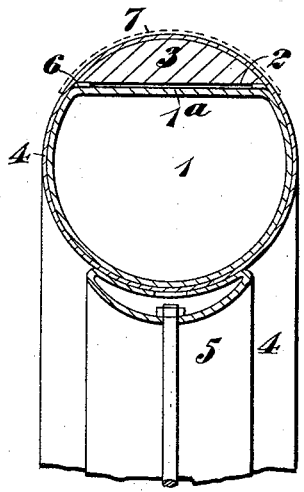
Figure 9:
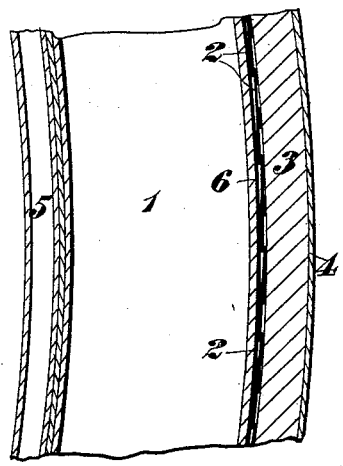
Figure 11:
Figure 6:
Figure 7:
Figure 10:
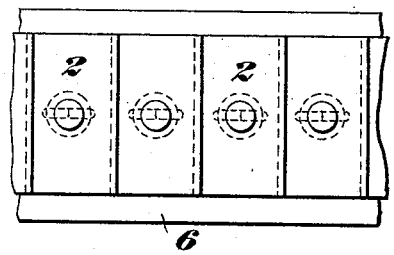

In the accompanying drawings, Figure 1 is a cross-section of a pneumatic tire constructed according to this invention; and Fig. 2 is a section thereof on the line $xx$, Fig. 1. Figs. 3 and 4 are sections at right angles to each other, and Fig. 5 a cross-section illustrating modified constructions. Figs. 6 and 7 are detail views. Figs. 8 and 9 are similar views to Figs. 1 and 2, respectively, illustrating a further modified construction; and Figs. 10 and 11 are respectively a plan and longitudinal section of the protecting-band used therein. Figs. 12 to 16, inclusive, illustrate various modified arrangements of the protecting-band and elastic strip.

Referring to Figs. 1 and 2, 1 is the air-tube of the pneumatic tire. 2 is a protecting-band capable when the tire is rolling, while supporting a load, of readily undergoing slight contraction and expansion in its length. For this purpose the band is made of thin transversely-corrugated strip metal, which may be steel, in one length or in a number of short pieces, arranged to surround the air-tube and to flatten this tube on the outer periphery, as shown at $1^a$. Such a band is very flexible in its length, while rigid in its breadth, and is of small weight. These are features of great importance in protecting-bands for pneumatic tires. 3 is a strip of elastic material—for example, india-rubber—wrapped around the protecting-band and having its ends in contact with each other. 4 is an outer covering or layer of tough flexible material—as, for example, prepared canvas—such as is ordinarily employed to prevent undue expansion of the air-tube. Between this outer covering and the air-tube the corrugated-metal band 2 and elastic strip 3 are confined, so that the said strip 3 is subjected to the air-pressure within the air-tube. The tire thus constructed is finally covered with a layer or with a thin coat of india-rubber in the usual way to render it water-proof and protect it against wear. The complete tire may be secured on the wheel-rim 5 in any known or suitable manner, as well understood. To still further simplify the construction of such tires, the corrugated-steel band 1 may be molded or embedded in or combined with the plano-convex strip of india-rubber 3, as shown in Figs. 3 and 4, so that the two can be applied to or removed from the air-tube as one piece instead of separately.

Figure 5:
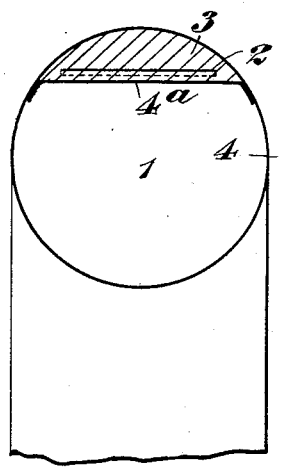

In the further simplified construction of pneumatic tire shown in Fig. 5 the outer covering 4, of prepared canvas, formed in conjunction with a strip of canvas $4^a$, the edge portions of which are cemented to the outer covering, the wall of the air tube or chamber 1, the inner side of the covering being coated or lined with a thin layer of india-rubber to render it air-tight. In making up such a tire the strip $4^a$, the protecting-band 2, and elastic strip 3 are placed upon a mandrel forming part of a circular ring having the same diameter as the tire to be produced, and a cross-section corresponding to that of the air-tube when inflated. Around these parts and the mandrel the outer covering 4 of prepared canvas, in the form of a strip or ribbon, is then wound spirally, so as to form an air tube or chamber of the cross-section shown, between which and the said outer covering the protecting-band and flexible strip are firmly held. When a portion of the tire has thus been made, it is drawn off the mandrel and a fresh length of the strip 4ª, protecting-band, and elastic strip 3 drawn onto the mandrel and similarly wound, these operations being repeated until nearly the whole length of the flexible strip has been covered. The ends of the compound tube thus formed are then jointed together in any suitable way—as, for example, by a short length of thin india-rubber tubing cemented within the ends. The air-tube thus formed is then partly inflated and the remainder of the covering wound over the joint. The outer covering is then coated or covered with india-rubber, which is afterward vulcanized, thus completing the tire. As will be obvious, such a tire will be very light. The ends of the corrugated-metal band 2 or of the separate lengths of which it may be made can be connected together in various ways. Thus the ends may be overlapped to the extent of, say, one corrugation, as shown in side elevation in Fig. 6, or the ends of the band or of the separate lengths in which it is made may be bent over, so that one may be hooked onto another, as shown in side elevation in Fig. 7.

In the construction of pneumatic tire shown in Figs. 8 to 11, inclusive, the protecting-band is composed of a number of pieces or plates 2 of hard material—such, for example, as steel—that are practically straight or flat in cross-section. These plates are secured to an endless strip 6 of flexible material—such as canvas—to form a continuous hard but flexible protecting-band, and are arranged to overlap each other, as shown, in order to prevent puncture of the air-tube taking place between them. The flat plates instead of being secured to a flexible strip 6, Figs. 8 to 11, may be each bent at the ends, so that they can be hooked together, as shown in Fig. 12, or the plates 2 may be combined with the elastic strip 3 for the purpose of reducing their combined weight for simplifying their construction, and facilitating their application to the exterior of the air-tube. For this purpose the plates may be secured to the flat side of the plano-convex ring by forming each of them at the sides or ends with small turned-over ears 2ª, as shown in cross-section and plan, respectively, in Figs. 13 and 14, these ears being inserted or molded in the india-rubber strip 3 when the same is in a soft or plastic state; or the plates may be secured to the flat side of the strip by loops 2ᵇ, which are struck up from the plates and are caused to project into and engage with the india-rubber ring when the same is in a plastic state, as shown in Fig. 15; or the overlapping plates may be wholly embedded or molded within the strip, as shown in Fig. 16.

As will be obvious, the plates 2 may be connected together in various other ways to form a flexible protecting-band of the kind referred to; also, that a protecting-band and flexible strip of plano-convex form may be introduced between the air-tubes and flexible covering of existing pneumatic tires.

Pneumatic tires constructed as described possess many important practical advantages. Thus when the air-tube 1 is fully inflated for use the india-rubber strip 3 will be constantly subject to the pressure of the compressed air in the air-tube and little further compression of it will take place at the point of contact with the ground. Consequently the loss of power due to such compression, which usually obtains when a tire is covered with a layer of india-rubber placed outside the canvas tube or covering 4 or its equivalent, ordinarily employed to strengthen the air-tube and not under pressure, will be considerably reduced; also, by covering the protecting-band with a plano-convex strip the tire will have a narrow running-surface of practically constant breadth, whereby road-friction will be reduced to a minimum. Furthermore, by the use of a hard protecting-band of the kind described, a lower air-pressure than would otherwise be necessary in the air-tube may be advantageously employed, particularly in road-riding. Hitherto the breadth of the running-surface being dependent on the degree of the air-pressure in the air-tube to make it narrow and reduce the loss of power involved inflection of the tire for the purpose of attaining the highest practical speed in riding, it has been necessary to make the tire as hard as possible. This has impaired its capacity to diminish vibration in riding on rough surfaces, and has frequently led to its bursting. By the construction hereinbefore described, the breadth of the running-surface being constant and independent of the degree of the air-pressure, the motive for using an exceptionally-high air-pressure is removed, and greater comfort in riding over rough surfaces can be secured without impairing the ease of running of the tire.

The change which takes place in the cross-sectional form of an ordinary pneumatic tire on contact with the ground consists of a flattening of the portion next the ground to a surface of such breadth that if the air-pressure in the air-tube is such as in practice it is found it ought to be, it supports the weight of the rider and machine with very slight lateral expansion of the tire, and, further, of a slight compression of the rubber with which the tire is covered over the portion which is thus flattened on the ground. Until the tire thus to some extent flattens on the ground, it has, even with the highest air-pressure it is practicable to employ, very little power to support the weight of the rider and machine, but when so flattened out the breadth of the tread which the form of the tire produces renders it very hard to resist further compression. This change of form involves the maximum of friction in proportion to its amount because the portion of the tire thus chiefly subject to flexion and compression having to bear the wear of the road-friction and to withstand as far as possible cutting and puncture must necessarily be made of considerable thickness while the rest of the tire may be made materially thinner, and because the flexion of this portion of the tire from an arched to a flat shape is of high angular amount. By my improved construction of tire no material change takes place in the cross-sectional form of the running-surface of the tire for contact with the ground, that portion being merely slightly depressed bodily into the air-tube, and thus almost the whole of the friction usually involved in the flattening of the running-surface of ordinary tires is saved. The depression of the running-surface of the tire on contact with the ground causes, as in other tires, the sides of the tire to expand in proportion, but the sides, as they never come in contact with the ground, may be made very thin—for example, about a tenth of the thickness of the portion next the road—so that flexion at the sides will involve the least possible amount of friction; also, the angular amount of the flexion will be small, as it takes place half on one side and half on the other of the tire, and consists, merely, of a change from the normal curved form of the tire to a form slightly more curved. Consequently to secure greater reduction of vibration and comfort in riding, such tires may, as I have said, with advantage be ridden with more spring in them than others without any material loss of power in friction due to the flexion of the tire and without increasing the running-surface to an objectionable degree. The change which takes place in the form of the longitudinal section of a tire on contact with the ground being of very small angular amount, is of trifling consequence and does not materially differ in these tires as compared with others.

In pneumatic tires constructed as described I find it unnecessary to employ an exterior coating of rubber thicker than is merely necessary to water-proof the air-tube. I thereby effect great saving in cost and in weight. The narrow portion of the tire which comes in contact with the road may advantageously be protected by a wearing-strip of suitable material—for example, india-rubber or leather—as indicated in dotted lines at 7 in Fig. 1. This strip, which need only be of slight thickness, may be cemented in place, so as to be easily renewable when necessary, and is the only part which will usually require to be repaired.

Pneumatic tires constructed as described may in consequence of their narrow running-surface, great resiliency, and ease of running be advantageously used for machines intended exclusively for use on racing-paths; also, owing to the practicability of making them of the requisite strength and durability, they may be employed with advantage on the wheels of light fast-running vehicles other than cycles.

What I claim is—

1. In a pneumatic tire, a protecting-band capable of readily undergoing slight contraction and expansion of length when in use at a number of points and flat or straight in cross-section and a strip of elastic material, such as india-rubber, of plano-convex form in cross-section, secured at its flat side to said protecting-band, so as to form therewith a combined protecting-band and elastic strip, substantially as herein described, for the purpose specified.

2. In a pneumatic tire, a protecting-band composed of sheet metal corrugated transversely throughout its length and flat or straight in cross-section and an outer elastic strip of plano-convex form in cross-section and in which said protecting-band is molded or embedded, so as to form therewith a combined protecting-band and elastic strip, substantially as herein described, for the purpose specified.

3. In a pneumatic tire, a combined protecting-band composed of sheet metal corrugated transversely throughout its length and flat or straight in cross-section and an outer elastic strip of plano-convex form in cross-section and in which said protecting-band is molded or embedded, substantially as herein described, for the purpose specified.

4. In a pneumatic tire, the combination, with an outer covering or tube forming or inclosing the air tube or chamber of the tire and an inner protecting-band capable when said tire is in use of readily undergoing slight longitudinal contraction and expansion at a number of places throughout its length, of an elastic strip arranged between the protecting-band and the outer covering or tube, so as to be constantly subjected to the pressure of air within said air tube or chamber, substantially as herein described, for the purposes specified.

5. In a pneumatic tire, the combination of an outer covering forming or inclosing the air tube or chamber, a protecting-band composed of transversely-corrugated sheet metal, and an elastic strip of plano-convex cross-section arranged between said air tube or chamber and outer covering and surrounding said protecting-band, substantially as herein described, for the purpose specified.

6. In a pneumatic tire, the combination of an outer tubular covering forming the wall of an air tube or chamber, a strip of flexible material located within and secured at its edges to said tubular covering, a protecting-band capable when in use of readily undergoing contraction and expansion at a number of points throughout its length and arranged between said tubular covering and said strip of flexible material, and an elastic strip of plano-convex cross-section arranged between said protecting-band and outer tubular covering, substantially as herein described.

7. A pneumatic tire comprising a tubular covering composed of a spirally-wound ribbon of suitable material, such as canvas, having on each side a layer of india-rubber and forming an air tube or chamber, a strip of flexible material located within and secured at its edges to said tubular covering, a strip of india-rubber arranged between said flexible strip and tubular covering, and a protecting-band composed of transversely-corrugated sheet metal arranged within said strip of india-rubber, substantially as herein described, for the purposes specified.

In testimony whereof I have signed my name to this specification in the presence of two subscribing witnesses.

THOMAS DUNN.

Witnesses:
WM. THOS. MARSHALL,
EDMUND S. SNEWIN,
*Both of 2 Pope's Head Alley, Cornhill, London, Gent'n.*